(12) United States Patent
Yang

(10) Patent No.: US 12,445,920 B2
(45) Date of Patent: Oct. 14, 2025

(54) INFORMATION TRANSMISSION METHOD, COMMUNICATION DEVICE, AND STORAGE MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOVILE SOFTWARE CO., LTD., Beijing (CN)

( * ) Notice: Subject to any disclaimer, the term of this patent is extended or adjusted under 35 U.S.C. 154(b) by 414 days.

(21) Appl. No.: 18/014,127

(22) PCT Filed: Aug. 4, 2020

(86) PCT No.: PCT/CN2020/106920
§ 371 (c)(1),
(2) Date: Dec. 30, 2022

(87) PCT Pub. No.: WO2022/027260
PCT Pub. Date: Feb. 10, 2022

(65) Prior Publication Data
US 2023/0308967 A1 Sep. 28, 2023

(51) Int. Cl.
H04W 36/00 (2009.01)
(52) U.S. Cl.
CPC .......... H04W 36/008375 (2023.05)
(58) Field of Classification Search
CPC ...... H04W 36/008375; H04W 24/10
USPC ........................ 370/331; 455/312
See application file for complete search history.

(56) References Cited

U.S. PATENT DOCUMENTS

| 9,344,937 | B2 | 5/2016 | Jung et al. |
| 9,615,234 | B2 | 4/2017 | Kowalewski et al. |
| 9,635,530 | B2 | 4/2017 | Ayyalasomayajula et al. |
| 9,894,588 | B2 | 2/2018 | Kim et al. |
| 10,051,503 | B2 | 8/2018 | Yang et al. |
| 10,104,239 | B2 | 10/2018 | Gupta |
| 10,178,236 | B2 | 1/2019 | Kowalewski et al. |
| 10,212,637 | B2 | 2/2019 | Jung et al. |
| 10,356,683 | B2 | 7/2019 | Kim et al. |
| 10,834,655 | B2 | 11/2020 | Kim et al. |

(Continued)

FOREIGN PATENT DOCUMENTS

| CN | 103501517 A | 1/2014 |
| CN | 103596217 A | 2/2014 |

(Continued)

OTHER PUBLICATIONS

Supplementary European Search Report issued in Application No. 20947947.6 dated Mar. 18, 2024, (14p).

(Continued)

Primary Examiner — Marcos Batista
(74) Attorney, Agent, or Firm — Arch & Lake LLP; Hao Tan; Shen Wang

(57) ABSTRACT

An information transmission method and apparatus, a communication device, and a storage medium are provided. The method includes that: a user equipment (UE) reports historical mobile information to a base station, where the historical mobile information includes first mobile information. Furthermore, the first mobile information is recorded by the UE in response to a cell change of the UE, and the first mobile information is associated with the cell change of the UE.

18 Claims, 4 Drawing Sheets

(56) References Cited

U.S. PATENT DOCUMENTS

| | | |
|---|---|---|
| 2015/0087313 A1 | 3/2015 | Kim et al. |
| 2015/0109965 A1 | 4/2015 | Ayyalasomayajula et al. |
| 2015/0109972 A1 | 4/2015 | Khoryaev et al. |
| 2015/0109997 A1 | 4/2015 | Sirotkin et al. |
| 2015/0111581 A1 | 4/2015 | Yiu et al. |
| 2015/0208303 A1* | 7/2015 | Jung .................. H04W 36/302 455/436 |
| 2015/0382182 A1 | 12/2015 | Lim et al. |
| 2016/0198384 A1 | 7/2016 | Jung et al. |
| 2016/0295441 A1 | 10/2016 | Yang et al. |
| 2017/0013496 A1 | 1/2017 | Gupta |
| 2017/0208180 A1 | 7/2017 | Kowalewski et al. |
| 2018/0242217 A1 | 8/2018 | Kim et al. |
| 2019/0342815 A1 | 11/2019 | Kim et al. |

FOREIGN PATENT DOCUMENTS

| | | |
|---|---|---|
| CN | 104272777 A | 1/2015 |
| CN | 104521257 A | 4/2015 |
| CN | 105580403 A | 5/2016 |
| CN | 110351699 A | 10/2019 |

OTHER PUBLICATIONS

Ericsson, "Mobility History Information Reporting from the UE," 3GPP TSG-RAN WG, Meeting#108, R2-1915753, Reno, US, Nov. 18-22, 2019, (5p).

3Gpp, "3rd Generation Partnership Project; Technical Specification Group Radio Access Network; NR; Radio Resource Control (RRC) protocol specification (Release 16)," 3GPP TS 38.331 V16.1.0, Jul. 24, 2020, (904p).

International Search Report of PCT/CN2020/106920 dated Apr. 27, 2021, (10p).

\* cited by examiner

INFORMATION TRANSMISSION METHOD, COMMUNICATION DEVICE, AND STORAGE MEDIUM

CROSS-REFERENCE TO RELATED APPLICATION

This application is the U.S. national phase application of International Patent Application No. PCT/CN2020/106920, filed on Aug. 4, 2020, the entire contents of which are incorporated herein by reference for all purposes.

FIELD

The present application relates to, but is not limited to, the technical field of wireless communication, and in particular, to information transmission methods, a communication device, and a storage medium.

BACKGROUND

Currently, whether a user equipment (UE), such as a mobile terminal, performs cell handover is determined according to a signal strength. If the signal strength of a neighboring cell is higher than that of a serving cell, it is determined that the neighboring cell is a handover target cell, and a base station initiates a handover process.

A machine learning algorithm is one of the most important implementation methods of an artificial intelligence technology at present. A model can be obtained by machine learning from a large amount of training data, and events can be predicted through the model. In many fields, models trained by the machine learning can obtain very accurate prediction results.

The machine learning can be applied to the process of the cell handover, such as a cell handover prediction, so as to make the cell handover intelligent. The machine learning requires a large amount of movement information of the UE for model training. Here, the movement information may include various data related to the cell handover of the UE.

SUMMARY

According to a first aspect of the present disclosure, there is provided an information transmission method, which is applied to a user equipment (UE), and the method includes reporting historical movement information to a base station. The historical movement information includes first movement information, the first movement information is recorded by the UE in response to a cell change of the UE, and the first movement information is associated with the cell change of the UE.

According to a second aspect of the present disclosure, there is provided an information transmission method, which is applied to a base station, and the method includes receiving historical movement information reported by a UE. The historical movement information includes first movement information, the first movement information is recorded by the UE in response to a cell change of the UE, and the first movement information is associated with the cell change of the UE.

According to a third aspect of the present disclosure, there is provided a communication device, including a processor, a memory, and an executable program stored in the memory and capable of being run by the processor, and the processor is configured to execute steps of the information transmission method described in the first aspect or the second aspect when running the executable program.

According to a fourth aspect of the present disclosure, there is provided a non-transitory storage medium having stored therein executable programs that, when executed by a processor, cause steps of the information transmission method described in the first aspect or the second aspect to be implemented.

It is to be understood that both the foregoing general description and the following detailed description are illustrative and explanatory only and are not restrictive of the embodiments of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the embodiments of the present disclosure.

DETAILED DESCRIPTION

Figure 1:
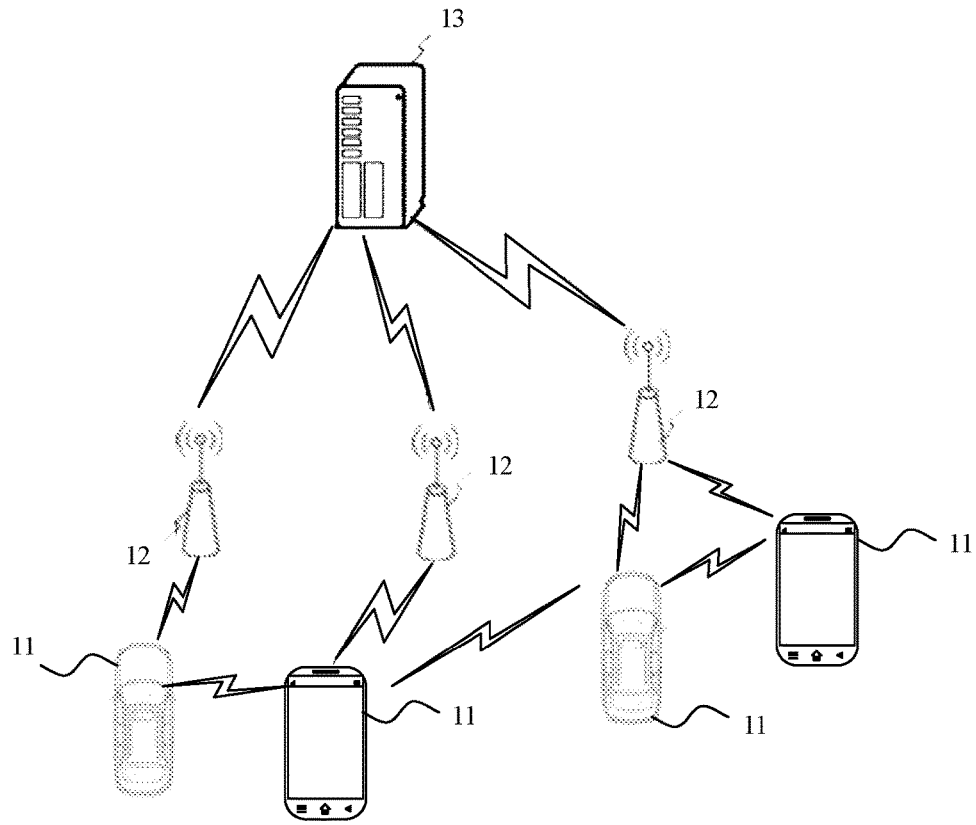
FIG. 1 is a schematic diagram showing a wireless communication system according to an embodiment.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with some aspects of embodiments of the present disclosure as recited in the appended claims.

Terms used in embodiments of the present disclosure are only for the purpose of describing specific embodiments, but should not be construed to limit the embodiments of the present disclosure. As used in the embodiments of the present disclosure and the appended claims, "a/an", "said" and "the" in singular forms are intended to include plural forms, unless clearly indicated in the context otherwise. It should also be understood that, the term "and/or" used herein represents and contains any or all possible combinations of one or more associated listed items.

It should be understood that, although terms such as "first," "second" and "third" may be used in embodiments of the present disclosure for describing various information, these information should not be limited by these terms. These terms are only used for the purpose of distinguishing information of the same type from each other. For example, first information may also be referred to as second information, and similarly, the second information may also be referred to as the first information, without departing from the scope of embodiments of the present disclosure. As used herein, the term "if" may be construed as "when" or "upon" or "in response to determining" depending on the context.

Currently, the handover is initiated by the base station, and the whole process of the handover is performed in a connected state. The network can obtain data related to the handover, including location, time, radio channel quality, etc. However, if the UE is not in the connected state, the network cannot obtain the movement information of the UE. When the UE enters the connected state, the model cannot be trained quickly due to the lack of the movement information, and accurate prediction results cannot be obtained.

According to some embodiments of the present disclosure, there is provided an information transmission method, which is applied to a user equipment (UE), and the method includes reporting historical movement information to a base station. The historical movement information includes first movement information, the first movement information is recorded by the UE in response to a cell change of the UE, and the first movement information is associated with the cell change of the UE.

In an embodiment, the first movement information includes at least one of: cell state information associated with the cell change of the UE; or cell change information associated with the cell change of the UE.

In an embodiment, the cell change information includes at least one of: time information of the cell change of the UE; or trigger event information that triggers the cell change of the UE.

In an embodiment, the state information includes at least one of following information of a cell associated with the cell change of the UE: geographic location information, cell frequency information, cell identification information, public land mobile network (PLMN) identification information, or wireless signal measurement result information.

In an embodiment, the cell change of the UE includes one of: cell selection of the UE; cell reselection of the UE; or cell handover of the UE.

In an embodiment, the cell change of the UE includes change of a serving cell of the UE in a connected state, or change of a resident cell of the UE in a non-connected state.

In an embodiment, the historical movement information is carried in a UE information reply message and/or a measurement report message.

In an embodiment, the method further includes sending first indication information indicating that the UE has the historical movement information to the base station in response to the UE recorded with the historical movement information.

In an embodiment, the first indication information is carried in a radio resource control (RRC) establishment completion message, and/or an RRC re-establishment completion message, and/or an RRC recovery completion message.

In an embodiment, the method further includes receiving second indication information sent by the base station, the second indication information indicating the UE to report the historical movement information to the base station; and reporting the historical movement information to the base station includes sending the historical movement information to the base station in response to receiving the second indication information.

In an embodiment, receiving the second indication information sent by the base station includes receiving the second indication information carrying an information type of the historical movement information; and reporting the historical movement information to the base station includes sending the historical movement information corresponding to the information type to the base station in response to receiving the second indication information.

In an embodiment, the second indication information is carried in a UE information request message and/or an RRC reconfiguration message.

In an embodiment, the historical movement information is associated with a cell change within a predetermined time period of the UE, or the historical movement information is associated with a predetermined number of cell changes of the UE.

According to some embodiments of the present disclosure, there is provided an information transmission method, which is applied to a base station, and the method includes receiving historical movement information reported by a UE. The historical movement information includes first movement information, the first movement information is recorded by the UE in response to a cell change of the UE, and the first movement information is associated with the cell change of the UE.

In an embodiment, the first movement information includes at least one of: cell state information associated with the cell change of the UE; or cell change information associated with the cell change of the UE.

In an embodiment, the cell change information includes at least one of: time information of the cell change of the UE; or trigger event information that triggers the cell change of the UE.

In an embodiment, the state information includes at least one of following information of a cell associated with the cell change of the UE: geographic location information, cell frequency information, cell identification information, public land mobile network (PLMN) identification information, or wireless signal measurement result information.

In an embodiment, the cell change of the UE includes one of: cell selection of the UE; cell reselection of the UE; or cell handover of the UE.

In an embodiment, the cell change of the UE includes change of a serving cell of the UE in a connected state, or change of a resident cell of the UE in a non-connected state.

In an embodiment, the historical movement information is carried in a UE information reply message and/or a measurement report message.

In an embodiment, the method further includes receiving first indication information sent by the UE indicating that the UE has the historical movement information.

In an embodiment, the first indication information is carried in a radio resource control (RRC) establishment completion message, and/or an RRC re-establishment completion message, and/or an RRC recovery completion message.

In an embodiment, the method further includes sending second indication information indicating to report the historical movement information in response to receiving the first indication information.

In an embodiment, sending the second indication information indicating to report the historical movement information includes sending the second indication information carrying an information type of the historical movement information to be reported.

In an embodiment, the second indication information is carried in a UE information request message and/or an RRC reconfiguration message.

In an embodiment, the historical movement information is associated with a cell change within a predetermined time period of the UE, or the historical movement information is associated with a predetermined number of cell changes of the UE.

According to some embodiments of the present disclosure, there is provided an information transmission apparatus, which is applied to a user equipment (UE), the apparatus includes a first sending module configured to report historical movement information to a base station, the historical movement information includes first movement information, the first movement information is recorded by the UE in response to a cell change of the UE, and the first movement information is associated with the cell change of the UE.

In an embodiment, the first movement information includes at least one of: cell state information associated with the cell change of the UE; or cell change information associated with the cell change of the UE.

In an embodiment, the cell change information includes at least one of: time information of the cell change of the UE; or trigger event information that triggers the cell change of the UE.

In an embodiment, the state information includes at least one of following information of a cell associated with the cell change of the UE: geographic location information, cell frequency information, cell identification information, public land mobile network (PLMN) identification information, or wireless signal measurement result information.

In an embodiment, the cell change of the UE includes one of: cell selection of the UE; cell reselection of the UE; or cell handover of the UE.

In an embodiment, the cell change of the UE includes change of a serving cell of the UE in a connected state, or change of a resident cell of the UE in a non-connected state.

In an embodiment, the historical movement information is carried in a UE information reply message and/or a measurement report message.

In an embodiment, the apparatus further includes a second sending module configured to send first indication information indicating that the UE has the historical movement information to the base station in response to the UE recorded with the historical movement information.

In an embodiment, the first indication information is carried in a radio resource control (RRC) establishment completion message, and/or an RRC re-establishment completion message, and/or an RRC recovery completion message.

In an embodiment, the apparatus further includes a first receiving module configured to receive second indication information sent by the base station, the second indication information indicates the UE to report the historical movement information to the base station; and the first sending module includes a first sending sub-module configured to send the historical movement information to the base station in response to receiving the second indication information.

In an embodiment, the first receiving module includes a receiving sub-module configured to receive the second indication information carrying an information type of the historical movement information; and the first sending module includes a second sending sub-module configured to send the historical movement information corresponding to the information type to the base station in response to receiving the second indication information.

In an embodiment, the second indication information is carried in a UE information request message and/or an RRC reconfiguration message.

In an embodiment, the historical movement information is associated with a cell change within a predetermined time period of the UE, or the historical movement information is associated with a predetermined number of cell changes of the UE.

According to some embodiments of the present disclosure, there is provided an information transmission apparatus, which is applied to a base station, the apparatus includes a second receiving module configured to receive historical movement information reported by a UE, the historical movement information includes first movement information, the first movement information is recorded by the UE in response to a cell change of the UE, and the first movement information is associated with the cell change of the UE.

In an embodiment, the first movement information includes at least one of: cell state information associated with the cell change of the UE; or cell change information associated with the cell change of the UE.

In an embodiment, the cell change information includes at least one of: time information of the cell change of the UE; or trigger event information that triggers the cell change of the UE.

In an embodiment, the state information includes at least one of following information of a cell associated with the cell change of the UE: geographic location information, cell frequency information, cell identification information, public land mobile network (PLMN) identification information, or wireless signal measurement result information.

In an embodiment, the cell change of the UE includes one of: cell selection of the UE; cell reselection of the UE; or cell handover of the UE.

In an embodiment, the cell change of the UE includes change of a serving cell of the UE in a connected state, or change of a resident cell of the UE in a non-connected state.

In an embodiment, the historical movement information is carried in a UE information reply message and/or a measurement report message.

In an embodiment, the apparatus further includes a third receiving module configured to receive first indication information sent by the UE indicating that the UE has the historical movement information.

In an embodiment, the first indication information is carried in a radio resource control (RRC) establishment completion message, and/or an RRC re-establishment completion message, and/or an RRC recovery completion message.

In an embodiment, the apparatus further includes a third sending module configured to send second indication information indicating to report the historical movement information in response to receiving the first indication information.

In an embodiment, the third sending module includes a third sending sub-module configured to send the second indication information carrying an information type of the historical movement information to be reported.

In an embodiment, the second indication information is carried in a UE information request message and/or an RRC reconfiguration message.

In an embodiment, the historical movement information is associated with a cell change within a predetermined time period of the UE, or the historical movement information is associated with a predetermined number of cell changes of the UE.

According to some embodiments of the present disclosure, there is provided a communication device apparatus, including a processor, a memory, and an executable program stored in the memory and capable of being run by the processor, and the processor is configured to execute steps of the information transmission method described in the first aspect or the second aspect when running the executable program.

According to some embodiments of the present disclosure, there is provided a storage medium having stored therein executable programs that, when executed by a processor, cause steps of the information transmission method described in the first aspect or the second aspect to be implemented.

With the information transmission methods, information transmission apparatuses, the communication device, and the storage medium provided by embodiments of the present disclosure, the UE reports the historical movement information to the base station, the historical movement information includes the first movement information, the first movement information is recorded by the UE in response to the cell change of the UE, and the first movement information is associated with the cell change of the UE. By recording and sending the historical movement information of the UE to the base station, on the one hand, information of different cells changed in the movement of the UE can be recorded, on the other hand, a condition of the cell connected by the UE which cannot be directly acquired by the base station can be provided for the base station to query and acquire, thus ensuring the integrity of the movement information of the UE acquired by the base station during the movement of the UE.

Referring to FIG. 1, which is a schematic diagram showing a wireless communication system provided by embodiments of the present disclosure. As shown in FIG. 1, the wireless communication system is a communication system based on a cellular mobile communication technology, and may include several terminals 11 and several base stations 12.

The terminal 11 may refer to a device that provides voice and/or data connectivity for a user. The terminal 11 can communicate with one or more core networks via a radio access network (RAN). The terminal 11 may be an Internet of Things terminal, such as a sensor device, a mobile phone (or referred to as a "cellular" phone) and a computer with an Internet of Things terminal. For example, the terminal 11 may be a fixed, portable, pocket-sized, handheld, computer built-in or vehicle-mounted apparatus. For example, the terminal 11 may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may be a device of an unmanned aerial vehicle. Alternatively, the terminal 11 may be a vehicle-mounted device, for example, an electronic control unit with a wireless communication function, or a wireless communication device externally connected with an electronic control unit. Alternatively, the terminal 11 may be a roadside device, such as a street lamp, a signal lamp or other roadside devices with a wireless communication function.

The base station 12 may be a network side device in the wireless communication system. The wireless communication system may be a $4^{th}$ generation mobile communication (4G) system, also referred to as a long term evolution (LTE) system. Alternatively, the wireless communication system may be a 5G system, also referred to as a new radio (NR) system or a 5G NR system. Alternatively, the wireless communication system may be a next generation system of the 5G system. The access network in the 5G system may be referred to as a new generation-radio access network (NG-RAN), or a machine-type communication (MTC) system.

The base station 12 may be an evolved base station (such as an evolved node B, eNB for short) used in the 4G system. Alternatively, the base station 12 may be a base station used in the 5G system which adopts a centralized distributed architecture, such as the next Generation Node B (gNB). When the base station 12 adopts the centralized distributed architecture, it usually includes a central unit (CU) and at least two distributed units (DUs). The central unit is provided with a protocol stack of a packet data convergence protocol (PDCP) layer, a radio link control (RLC) layer, or a media access control (MAC) layer; and the distributed unit is provided with a protocol stack of a physical (PHY) layer. The specific implementation of the base station 12 is not limited in embodiments of the present disclosure.

A wireless connection can be established between the base station 12 and the terminal 11 through a wireless air interface. In different embodiments, the wireless air interface is a wireless air interface based on the 4th generation mobile communication network technology (4G) standard. Alternatively, the wireless air interface is a wireless air interface based on the 5th generation mobile communication network technology (5G) standard. For example, the wireless air interface is a new radio. Alternatively, the wireless air interface may also be a wireless air interface based on a next generation mobile communication network technology standard of the 5G.

In some embodiments, an end to end (E2E) connection may also be established between the terminals 11, for example, a vehicle to vehicle (V2V) communication, a vehicle to infrastructure (V2I) communication and a vehicle to pedestrian (V2P) communication in a vehicle to everything (V2X) communication.

In some embodiments, the wireless communication system may further include a network management device 13.

Several base stations 12 are connected to the network management device 13, respectively. The network management device 13 may be a core network device in the wireless communication system, for example, the network management device 13 may be a mobility management entity (MME) in an evolved packet core (EPC). Alternatively, the network management device may be other core network devices, such as a serving gateway (SGW), a public data network gateway (PGW), a policy and charging rules function (PCRF) or a home subscriber server (HSS). The implementation form of the network management device 13 is not limited in embodiment of the present disclosure.

Executors involved in embodiments of the present disclosed include, but are not limited to, a UE such as a mobile phone terminal that supports the cellular mobile communication, and a base station, etc.

Embodiments of the present disclosure may be applied to the following scenario. Currently, handover is initiated by a base station, and the entire process of the handover is performed in a connected state, so a network can determine data related to the handover. UE movement information for training a machine learning algorithm to predict cell handover is determined by the base station during the cell handover, but the base station cannot know movement information of the UE in processes of cell selection and cell reselection, so model training lacks relevant data. Consequently, accurate prediction results cannot be obtained.

Figure 2:
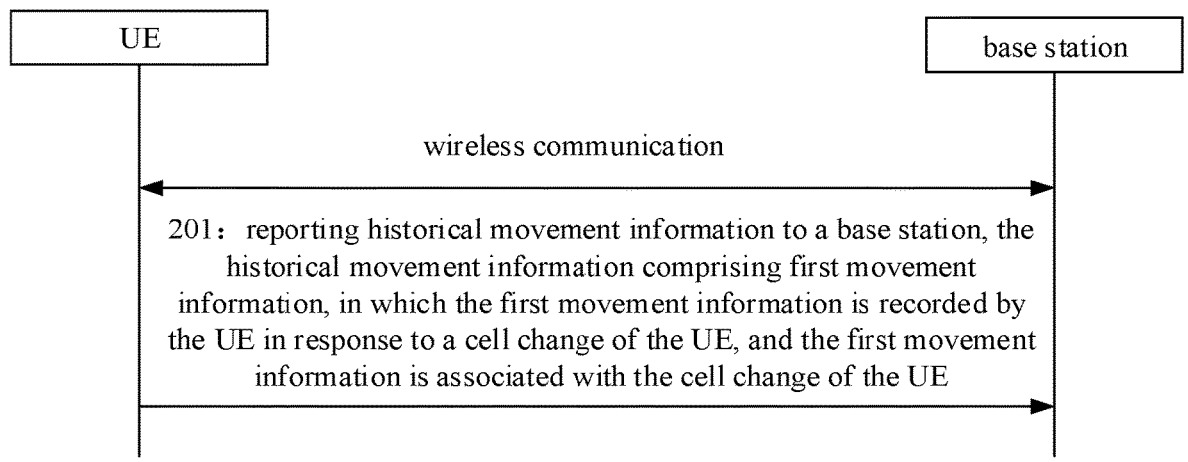
FIG. 2 is a flow chart showing an information transmission method according to an embodiment.

As shown in FIG. 2, an information transmission method is provided by an embodiment of the present disclosure, which can be applied to a UE of a cellular mobile communication system, and include a step 201.

In the step 201, historical movement information is reported to abase station, the historical movement information includes first movement information, the first movement information is recorded by the UE in response to a cell change of the UE, and the first movement information is associated with the cell change of the UE.

Here, the UE may be a mobile phone terminal or the like that uses a cellular mobile communication technology to perform wireless communication. In the cellular mobile communication system, the base station can use wireless signals with different frequencies to cover different areas. The different areas are called cells in the cellular mobile communication system.

The UE will enter from a signal coverage of a cell into a signal coverage of another cell during the movement. The UE will establish an association relationship with a cell when entering the wireless signal coverage of the cell. For example, when the UE is in a connected state, a cell to which the UE is connected is called a serving cell.

A state of the UE can be classified into a connected state, an idle state and an inactive state according to an association relationship between the UE and a cell. In the connected state, the UE establishes an RRC connection with the cell and can perform data transmission. In the idle state and the inactive state, the UE needs to establish an RRC connection with the cell through a random access procedure, and then performs data transmission.

When the UE is in the connected state, the UE establishes a communication connection in the cell to which the UE is connected, and the base station determines information of the cell to which the UE is connected through the communication connection.

When the UE is in the idle state, the base station does not retain the context of the UE, so a core network does not know the existence of the UE. In the idle state, the UE can still select a best cell to provide service signals by monitoring a signal quality of a neighboring cell and a current cell. Therefore, the base station cannot know the cell where the UE resides in the idle state.

When the UE is in the inactive state, the base station cannot know the cell where the UE resides either, when the UE moves beyond a predetermined range.

Here, the historical movement information may include one or more pieces of first movement information. The first movement information may be recorded by the UE in response to the cell change of the UE. When the UE undergoes the cell change due to various reasons, the UE may record the first movement information associated with the cell change. In an embodiment, the first movement information may be cell state information associated with a target cell and/or a source cell (when present) in the cell change, or cell change information associated with the cell change process of the cell change, or a combination thereof. Thus, the historical movement information may be a collection of movement information associated with one or more cell changes of the UE. The UE saves the historical movement information for reporting to the base station as required.

In an embodiment, the historical movement information is associated with a cell change within a predetermined time period of the UE, or the historical movement information is associated with a predetermined number of cell changes of the UE, or a combination thereof.

Specifically, the one or more pieces of first movement information included in the historical movement information may be recorded when the cell change occurs within a certain time period in the past. For example, the UE may save the first movement information within the past few months or days or hours. When the storage time of a certain piece of first movement information exceeds such time period, the UE will remove this overdue first movement information.

The historical movement information may also include the first movement information corresponding to the predetermined number of cell changes. For example, one piece of first movement information is configured to record one cell change. Therefore, a counter may be set. A count value of the counter is incremented by one each time the first movement information is recorded. When the count value of the counter exceeds a certain threshold, the first movement information recorded on the earliest date in the historical movement information is deleted.

The UE may send the historical movement information recorded by itself to the base station. The historical movement information may be used by the base station or the core network for artificial intelligence training, such as cell handover prediction model training.

Since the historical movement information may include the first movement information of the cell change of the UE in different states, the completeness of artificial intelligence training samples can be improved.

By recording and sending the historical movement information of the UE to the base station, on the one hand, information of different cells changed in the movement of the UE can be recorded, on the other hand, a condition of the cell connected by the UE which cannot be directly acquired by the base station can be provided for the base station to query and acquire, thus ensuring the integrity of the movement information of the UE acquired by the base station during the movement of the UE.

As described above, in an embodiment, the first movement information includes at least one of cell state information associated with the cell change of the UE; or cell change information associated with the cell change of the UE.

Here, the cell state information of each cell may include signal strength information of each cell, frequency information of each cell, etc., and may further include identification information of each cell and the like, and may further include wireless signal measurement information. For example, the wireless signal measurement information may include the number of wireless signal measurements, wireless signal measurement result, etc., before the cell change. The cell state information may include state information of a cell to which the UE is connected acquired when the UE is in the connected state, the idle state and/or the inactive state.

In an embodiment, the UE may only record cell state information of the target cell in the cell change. In another embodiment, the UE may record cell state information of the target cell and the source cell (when present) in the cell change.

Here, the cell change information may include information associated with the cell change of the UE from a cell to another cell, such as information of the cells before and after the change, the time of the change, a reason for the change, and/or a geographic location when the cell change occurs.

When the UE is in the idle state or the inactive state, and the UE changes from one resident cell to another resident cell, the base station cannot know whether the UE has undergone the cell change and associated cell change information. However, the UE may record the cell change information when the UE changes the cell connection, and provide the same to the base station. In this way, the cell state information and the cell change information of the UE that cannot be directly acquired by the base station can be recorded for the base station to query, thus ensuring the integrity of the movement information provided for training.

In an embodiment, the cell change information includes at least one of: time information of the cell change of the UE; or trigger event information that triggers the cell change of the UE.

The time information may indicate the time at which the UE performs the cell change. For example, the time information may indicate a time point at which the UE performs cell selection, cell reselection, and/or cell handover.

The trigger event information may be configured to indicate a trigger event which triggers the cell change of the UE. For example, the trigger event information may indicate a trigger event which triggers the cell selection, the cell reselection, and/or the cell handover of the UE.

The cell change of the UE may have different trigger events. For example, for the cell selection, the cell selection may be triggered by the UE turning on or entering a wireless signal coverage area from a blind area. For the cell reselection, the cell reselection may be triggered because the signal quality of the current resident cell cannot meet the resident requirement. For the cell handover, the cell handover may be triggered by the withdrawal of the serving cell, or the failure of the wireless signal measurement result to meet data transmission requirements.

In an embodiment, the state information includes at least one of following information of a cell associated with the cell change of the UE: geographic location information, cell frequency information, cell identification information, public land mobile network (PLMN) identification information, or wireless signal measurement information.

For example, the wireless signal measurement information may include the number of wireless signal measurements, wireless signal measurement result, etc., before the cell change.

The UE may send the cell state information and/or the cell change information to the base station. The artificial intelligence training is continued by the base station, the core network and the like using the collected data.

In an embodiment, the cell change of the UE includes one of: cell selection of the UE; cell reselection of the UE; or cell handover of the UE.

When the UE is turned on or enters the wireless signal coverage area from the blind area, the UE selects an appropriate cell to reside, and this process is called the cell selection. For the cell selection, the cell change information may include information associated with the cell selection of the UE, for example, cell information before and after the cell selection of the UE, the time of the cell selection, a reason for the cell selection, and/or a geographic location when the cell selection occurs, etc.

The reselection of the resident cell performed by the UE in the idle state or the inactive state is called the cell reselection. For the cell reselection, the cell change information may include information associated with the cell reselection of the UE, for example, cell information associated with the cell reselection of the UE, the time of the cell reselection, a reason for the cell reselection, and/or a geographic location when the cell reselection occurs, etc.

When the UE is in the connected state, the base station can determine whether the UE needs to be handed over from the current serving cell to a neighboring cell according to the wireless signal measurement result reported by the UE, that is, the process of the cell handover is initiated by the base station. For the cell handover, the cell change information may include information associated with the cell handover of the UE, for example, cell information before and after the cell handover of the UE, the time of the cell handover, a reason for the cell handover, and/or a geographic location when the cell handover occurs, etc.

In this way, the information of various cell changes during the movement of the UE is recorded, so as to ensure that the cell change information can cover different cell change situations, thereby ensuring the integrity of the cell change information.

In an embodiment, the cell change of the UE includes change of a serving cell of the UE in a connected state, or change of a resident cell of the UE in a non-connected state.

Here, the non-connected state includes the idle state and the inactive state.

When the UE is in the connected state, the UE establishes a communication link in the cell to which the UE is connected, and the cell to which the UE is connected is called the serving cell.

When the UE is in the idle state or the inactive state, the UE may select a cell as the cell to be connected after switching to the connected state, and the cell is called the resident cell.

In an embodiment, the historical movement information is carried in a UE information reply message and/or a measurement report message.

The historical movement information may be carried in the UE information reply message and/or the measurement report message. The UE information reply message is a response to a UE information request message sent by the base station, and is configured to provide the state information and the like of the UE to the base station. The measurement report message is configured to report the result of the wireless signal measurement performed by the UE to the base station. Carrying the historical movement information in the UE information reply message and/or the measurement report message can improve the utilization efficiency of the UE information reply message and/or the measurement report message.

Figure 3:
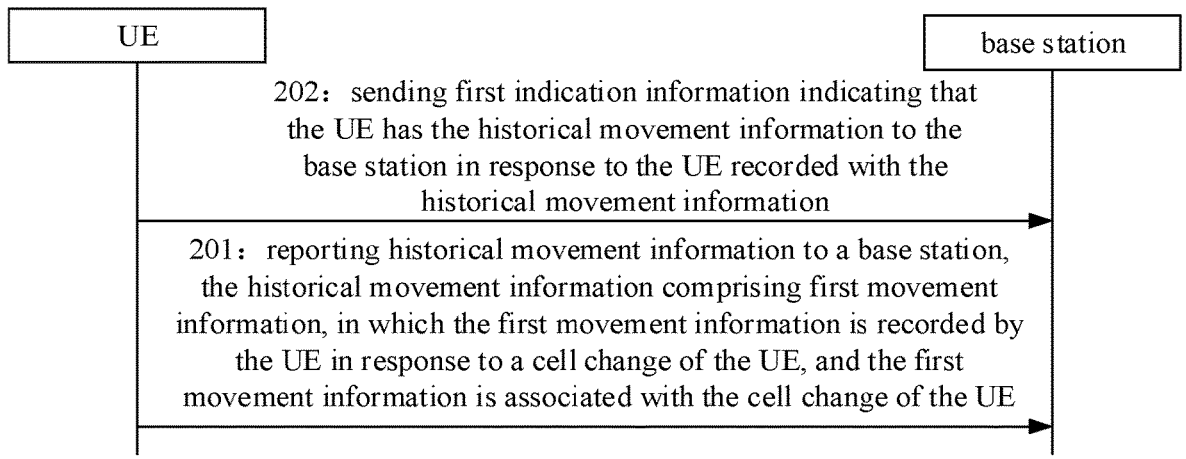
FIG. 3 is a flow chart showing another information transmission method according to an embodiment.

In an embodiment, as shown in FIG. 3, the method further includes a step 202.

In the step 202, first indication information indicating that the UE has the historical movement information is sent to the base station in response to the UE recorded with the historical movement information.

The UE can indicate to the base station that it has the historical movement information through the first indication information when it is recorded with the historical movement information. The base station may indicate whether the UE needs to send the historical movement information based on the first indication information.

In an embodiment, the first indication information is carried in a radio resource control (RRC) establishment completion message, and/or an RRC re-establishment completion message, and/or an RRC recovery completion message.

The UE needs to establish an RRC connection with the base station when switching from the idle state or the inactive state to the connected state. The UE may carry the recorded historical movement information in uplink and downlink RRC signaling during the establishment of the RRC connection. Carrying the historical movement information in the RRC establishment completion message, and/or the RRC re-establishment completion message, and/or the RRC recovery completion message can improve the utilization efficiency of the RRC establishment completion message, and/or the RRC re-establishment completion message, and/or the RRC recovery completion message.

In an embodiment, the method further includes receiving second indication information sent by the base station, the second indication information indicating the UE to report the historical movement information to the base station; and reporting the historical movement information to the base station includes sending the historical movement information to the base station in response to receiving the second indication information.

The base station may determine whether it needs to receive the historical movement information of the UE after receiving the first indication information. If the base station needs to receive the historical movement information, it may send the second indication information to the UE to indicate the UE to upload the historical movement information.

The UE may send the historical movement information to the base station after receiving the second indication information.

In an embodiment, receiving the second indication information sent by the base station includes receiving the second indication information carrying an information type of the historical movement information; and reporting the historical movement information to the base station includes sending the historical movement information corresponding to the information type to the base station in response to receiving the second indication information.

The base station may carry an indication in the second indication information to indicate the type of the historical movement information to be uploaded by the UE. The historical movement information may be divided according to different requirements. For example, it may be divided according to the state of the UE, the time period, or the type of cell change, etc. The UE can send the historical movement information corresponding to the information type to the base station according to the requirements of the base station.

Illustratively, the base station may request the historical movement information that is collected when the UE is in the non-connected state. The base station may also request the historical movement information associated with several serving cell changes within a certain time subsegment.

In an embodiment, the second indication information is carried in a UE information request message and/or an RRC reconfiguration message.

The UE may carry the historical movement information in the UE information reply message and report it to the base station in response to the second indication information being carried in the UE information request message.

The UE may carry the historical movement information in the RRC establishment completion message, and/or the RRC re-establishment completion message, and/or the RRC recovery complete message and report it to the base station in response to the second indication information being carried in the RRC reconfiguration message. In this way, the utilization efficiency of the UE information request message and/or the RRC reconfiguration message can be improved.

Figure 4:
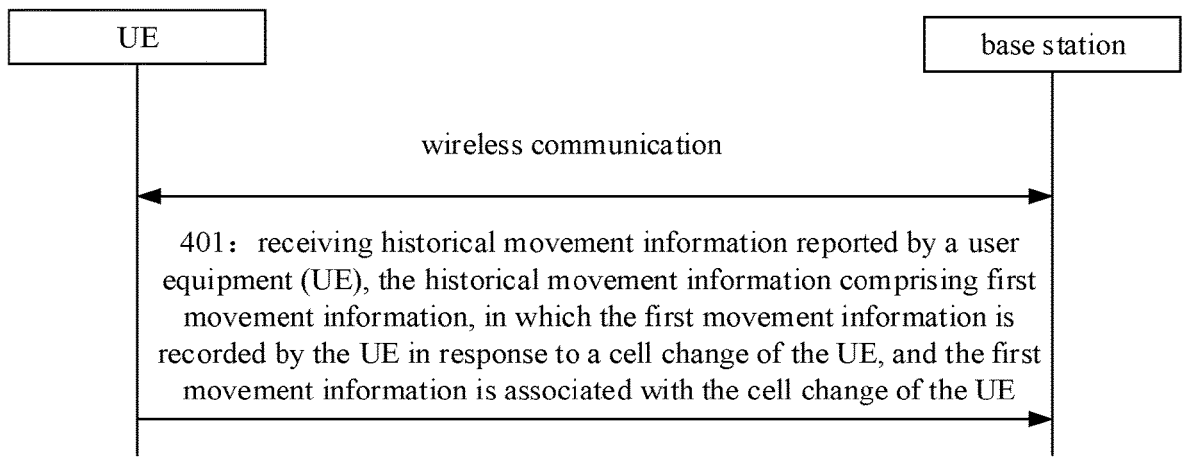
FIG. 4 is a flow chart showing yet another information transmission method according to an embodiment.

As shown in FIG. 4, an information transmission method is provided by embodiments of the present disclosure, which can be applied to a base station of a cellular mobile communication system, and includes a step 401.

In the step 401, historical movement information reported by a UE is received, the historical movement information includes first movement information, the first movement information is recorded by the UE in response to a cell change of the UE, and the first movement information is associated with the cell change of the UE.

Here, the UE may be a mobile phone terminal or the like that uses a cellular mobile communication technology to perform wireless communication. In the cellular mobile communication system, the base station can use wireless signals with different frequencies to cover different areas. The different areas are called cells in the cellular mobile communication system.

The UE will enter from a signal coverage of a cell into a signal coverage of another cell during the movement. The UE will establish an association relationship with a cell when entering the wireless signal coverage of the cell. For example, when the UE is in a connected state, a cell to which the UE is connected is called a serving cell.

A state of the UE can be classified into a connected state, an idle state and an inactive state according to an association relationship between the UE and a cell. In the connected state, the UE establishes an RRC connection with the cell and can perform data transmission. In the idle state and the inactive state, the UE needs to establish an RRC connection with the cell through a random access procedure, and then performs data transmission.

When the UE is in the connected state, the UE establishes a communication connection in the cell to which the UE is connected, and the base station determines information of the cell to which the UE is connected through the communication connection.

When the UE is in the idle state, the base station does not retain the context of the UE, so a core network does not know the existence of the UE. In the idle state, the UE can still select a best cell to provide service signals by monitoring a signal quality of a neighboring cell and a current cell. Therefore, the base station cannot know the cell where the UE resides in the idle state.

When the UE is in the inactive state, the base station cannot know the cell where the UE resides either, when the UE moves beyond a predetermined range.

Here, the historical movement information may include one or more pieces of first movement information. The first movement information may be recorded by the UE in response to the cell change of the UE. When the UE undergoes the cell change due to various reasons, the UE may record the first movement information associated with the cell change. In an embodiment, the first movement information may be cell state information associated with a target cell and/or a source cell (when present) in the cell change, or cell change information associated with the cell change process of the cell change, or a combination thereof. Thus, the historical movement information may be a collection of movement information associated with one or more cell changes of the UE. The UE saves the historical movement information for reporting to the base station as required.

In an embodiment, the historical movement information is associated with a cell change within a predetermined time period of the UE, or the historical movement information is associated with a predetermined number of cell changes of the UE, or a combination thereof.

Specifically, the one or more pieces of first movement information included in the historical movement information may be recorded when the cell change occurs within a certain time period in the past. For example, the UE may save the first movement information within the past few months or days or hours. When the storage time of a certain piece of first movement information exceeds such time period, the UE will remove this overdue first movement information.

The historical movement information may also include the first movement information corresponding to the predetermined number of cell changes. For example, one piece of first movement information is configured to record one cell change. Therefore, a counter may be set. A count value of the counter is incremented by one each time the first movement information is recorded. When the count value of the counter exceeds a certain threshold, the first movement information recorded on the earliest date in the historical movement information is deleted.

The UE may send the historical movement information recorded by itself to the base station. The historical movement information may be used by the base station or the core network for artificial intelligence training, such as cell handover prediction model training.

Since the historical movement information may include the first movement information of the cell change of the UE in different states, the completeness of artificial intelligence training samples can be improved.

By recording and sending the historical movement information of the UE to the base station, on the one hand, information of different cells changed in the movement of the UE can be recorded, on the other hand, a condition of the cell connected by the UE which cannot be directly acquired by the base station can be provided for the base station to query and acquire, thus ensuring the integrity of the movement information of the UE acquired by the base station during the movement of the UE.

As described above, in an embodiment, the first movement information includes at least one of: cell state information associated with the cell change of the UE; or cell change information associated with the cell change of the UE.

Here, the cell state information of each cell may include signal strength information of each cell, frequency information of each cell, etc., and may further include identification information of each cell and the like, and may further include wireless signal measurement information. For example, the wireless signal measurement information may include the number of wireless signal measurements, wireless signal measurement result, etc., before the cell change. The cell state information may include state information of a cell to which the UE is connected acquired when the UE is in the connected state, the idle state and/or the inactive state.

In an embodiment, the UE may only record cell state information of the target cell in the cell change. In another embodiment, the UE may record cell state information of the target cell and the source cell (when present) in the cell change. Here, the cell change information may include information associated with the cell change of the UE from a cell to another cell, such as information of the cells before and after the change, the time of the change, a reason for the change, and/or a geographic location when the cell change occurs.

When the UE is in the idle state or the inactive state, and the UE changes from one resident cell to another resident cell, the base station cannot know whether the UE has undergone the cell change and associated cell change information. However, the UE may record the cell change information when the UE changes the cell connection, and provide the same to the base station. In this way, the cell state information and the cell change information of the UE that cannot be directly acquired by the base station can be recorded for the base station to query and acquire, thus ensuring the integrity of the movement information provided for training.

In an embodiment, the cell change information includes at least one of: time information of the cell change of the UE; or trigger event information that triggers the cell change of the UE.

The time information may indicate the time at which the UE performs the cell change. For example, the time information may indicate a time point at which the UE performs cell selection, cell reselection, and/or cell handover.

The trigger event information may be configured to indicate a trigger event which triggers the cell change of the UE. For example, the trigger event information may indicate a trigger event which triggers the cell selection, the cell reselection, and/or the cell handover of the UE.

The cell change of the UE may have different trigger events. For example, for the cell selection, the cell selection may be triggered by the UE turning on or entering a wireless signal coverage area from a blind area. For the cell reselection, the cell reselection may be triggered because the signal quality of the current resident cell cannot meet the resident requirement. For the cell handover, the cell handover may be triggered by the withdrawal of the serving cell, or the failure of the wireless signal measurement result to meet data transmission requirements.

In an embodiment, the state information includes at least one of following information of a cell associated with the cell change of the UE: geographic location information, cell frequency information, cell identification information, public land mobile network (PLMN) identification information, or wireless signal measurement information. For example, the wireless signal measurement information may include the number of wireless signal measurements, wireless signal measurement result, etc., before the cell change.

The UE may send the cell state information and/or the cell change information to the base station. The artificial intelligence training is continued by the base station, the core network and the like using the collected data.

In an embodiment, the cell change of the UE includes one of: cell selection of the UE; cell reselection of the UE; or cell handover of the UE.

When the UE is turned on or enters the wireless signal coverage area from the blind area, the UE selects an appropriate cell to reside, and this process is called the cell selection. For the cell selection, the cell change information may include information associated with the cell selection of the UE, for example, cell information before and after the cell selection of the UE, the time of the cell selection, a reason for the cell selection, and/or a geographic location when the cell selection occurs, etc.

The reselection of the resident cell performed by the UE in the idle state or the inactive state is called the cell reselection. For the cell reselection, the cell change information may include information associated with the cell reselection of the UE, for example, cell information associated with the cell reselection of the UE, the time of the cell reselection, a reason for the cell reselection, and/or a geographic location when the cell reselection occurs, etc.

When the UE is in the connected state, the base station can determine whether the UE needs to be handed over from the current serving cell to a neighboring cell according to the wireless signal measurement result reported by the UE, that is, the process of the cell handover is initiated by the base station. For the cell handover, the cell change information may include information associated with the cell handover of the UE, for example, cell information before and after the cell handover of the UE, the time of the cell handover, a reason for the cell handover, and/or a geographic location when the cell handover occurs, etc.

In this way, the information of various cell changes during the movement of the UE is recorded, so as to ensure that the cell change information can cover different cell change situations, thereby ensuring the integrity of the cell change information.

In an embodiment, the cell change of the UE includes change of a serving cell of the UE in a connected state, or change of a resident cell of the UE in a non-connected state.

Here, the non-connected state includes the idle state and the inactive state.

When the UE is in the connected state, the UE establishes a communication link in the cell to which the UE is connected, and the cell to which the UE is connected is called the serving cell.

When the UE is in the idle state or the inactive state, the UE may select a cell as the cell to be connected after switching to the connected state, and the cell is called the resident cell.

In an embodiment, the historical movement information is carried in a UE information reply message and/or a measurement report message.

The historical movement information may be carried in the UE information reply message and/or the measurement report message. The UE information reply message is a response to a UE information request message sent by the base station, and is configured to provide the state information and the like of the UE to the base station. The measurement report message is configured to report the result of the wireless signal measurement performed by the UE to the base station. Carrying the historical movement information in the UE information reply message and/or the measurement report message can improve the utilization efficiency of the UE information reply message and/or the measurement report message.

In an embodiment, the method further includes receiving first indication information sent by the UE indicating that the UE has the historical movement information.

The UE can indicate to the base station that it has the historical movement information through the first indication information when it is recorded with the historical movement information. The base station may indicate whether the UE needs to send the historical movement information based on the first indication information.

In an embodiment, the first indication information is carried in a radio resource control (RRC) establishment completion message, and/or an RRC re-establishment completion message, and/or an RRC recovery completion message.

The UE needs to establish an RRC connection with the base station when switching from the idle state or the inactive state to the connected state. The UE may carry the recorded historical movement information in uplink and downlink RRC signaling during the establishment of the RRC connection. Carrying the historical movement information in the RRC establishment completion message, and/or the RRC re-establishment completion message, and/or the RRC recovery completion message can improve the utilization efficiency of the RRC establishment completion message, and/or the RRC re-establishment completion message, and/or the RRC recovery completion message.

In an embodiment, the method further includes sending second indication information indicating to report the historical movement information in response to receiving the first indication information.

The base station may determine whether it is needs to receive the historical movement information of the UE after receiving the first indication information. If the base station needs to receive the historical movement information, it may send the second indication information to the UE to indicate the UE to upload the historical movement information.

The UE may send the historical movement information to the base station after receiving the second indication information.

In an embodiment, sending the second indication information indicating to report the historical movement information includes sending the second indication information carrying an information type of the historical movement information to be reported.

The base station may carry an indication in the second indication information to indicate the type of the historical movement information to be uploaded by the UE. The historical movement information may be divided according to different requirements. For example, it may be divided according to the state of the UE, the time period, or the type of cell change, etc. The UE may send the historical movement information corresponding to the information type to the base station according to the requirements of the base station.

Illustratively, the base station may request the historical movement information that is collected when the UE is in the non-connected state. The base station may also request the historical movement information associated with several serving cell changes within a certain time subsegment.

In an embodiment, the second indication information is carried in a UE information request message and/or an RRC reconfiguration message.

The UE may carry the historical movement information in the UE information reply message and report it to the base station in response to the second indication information being carried in the UE information request message.

The UE may carry the historical movement information in the RRC establishment completion message, and/or the RRC re-establishment completion message, and/or the RRC recovery complete message and report it to the base station in response to the second indication information being carried in the RRC reconfiguration message. In this way, the utilization efficiency of the UE information request message and/or the RRC reconfiguration message can be improved.

A specific example is provided below in connection with any of the above-mentioned embodiments.

1. The UE records movement data, including, but not limited to, the time and geographic location when the serving cell of UE changes, the frequency of the serving cell, the identification of the serving cell, PLMN identification to which the serving cell belongs, the trigger event and available measurements.
   i. The serving cell change may be triggered by one of the following events, including cell reselection, cell selection, and cell handover.
   ii. The serving cell includes a serving cell of the UE in the connected state, and may also include a resident cell of the UE in the idle state.
2. When the UE enters the connected state, information indicating whether the UE has the movement data is carried in a message 1.
   i. The message 1 may include the RRC establishment completion message, the RRC re-establishment completion message, and the RRC recovery completion message.
3. The base station may send a request to the UE in a message 2 to request the movement data of the UE after receiving the message 1.

i. The message 2 may include the UE information request message, and the RRC reconfiguration message.
4. In the message 2, the base station may request some specific movement data.
   i. The message 2 carries an indication, indicating that only the movement data in the non-connected state is requested.
   ii. The message 2 carries a number, indicating that only the movement data of the latest several serving cell changes is requested.
5. The UE reports the movement data requested by the base station in a message 3 after receiving the message 2.
   i. The message 3 may include the UE information reply message and the measurement report message.
6. The base station receives the movement data for model training.

Figure 5:
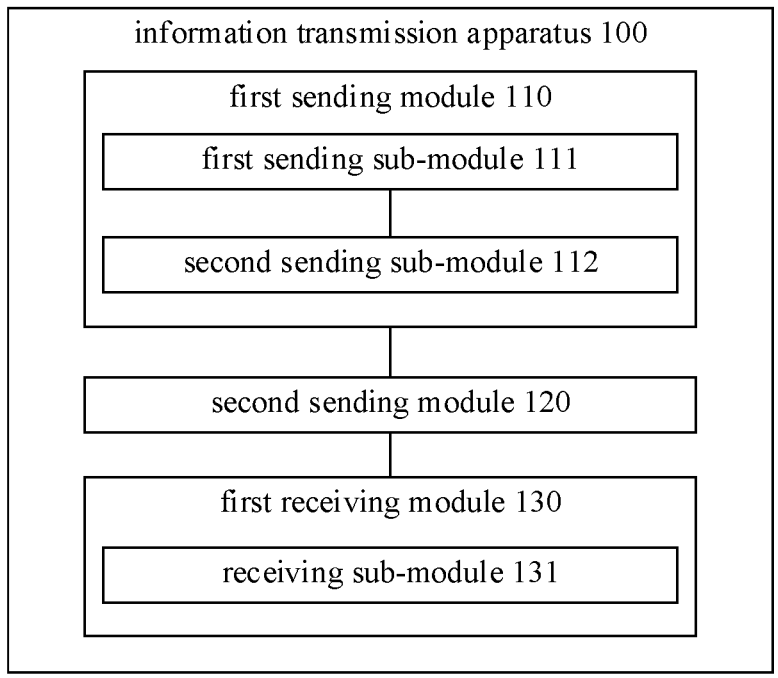
FIG. 5 is a block diagram showing an information transmission apparatus according to an embodiment.

Embodiments of the present disclosure further provide an information transmission apparatus, which is applied to a UE of wireless communication. As shown in FIG. 5, the information transmission apparatus 100 includes a first sending module 110.

The first sending module 110 is configured to report historical movement information to a base station, the historical movement information includes first movement information, the first movement information is recorded by the UE in response to a cell change of the UE, and the first movement information is associated with the cell change of the UE.

In an embodiment, the first movement information includes at least one of: cell state information associated with the cell change of the UE; or cell change information associated with the cell change of the UE.

In an embodiment, the cell change information includes at least one of: time information of the cell change of the UE; or trigger event information that triggers the cell change of the UE.

In an embodiment, the state information includes at least one of following information of a cell associated with the cell change of the UE: geographic location information, cell frequency information, cell identification information, public land mobile network (PLMN) identification information, or wireless signal measurement result information.

In an embodiment, the cell change of the UE includes one of: cell selection of the UE; cell reselection of the UE; or cell handover of the UE.

In an embodiment, the cell change of the UE includes change of a serving cell of the UE in a connected state, or change of a resident cell of the UE in a non-connected state.

In an embodiment, the historical movement information is carried in a UE information reply message and/or a measurement report message.

In an embodiment, the apparatus 100 further includes a second sending module 120 configured to send first indication information indicating that the UE has the historical movement information to the base station in response to the UE recorded with the historical movement information.

In an embodiment, the first indication information is carried in a radio resource control (RRC) establishment completion message, and/or an RRC re-establishment completion message, and/or an RRC recovery completion message.

In an embodiment, the apparatus 100 further includes a first receiving module 130 configured to receive second indication information sent by the base station, the second indication information indicates the UE to report the historical movement information to the base station. The first sending module 110 includes a first sending sub-module 111 configured to send the historical movement information to the base station in response to receiving the second indication information.

In an embodiment, the first receiving module 130 includes a receiving sub-module 131 configured to receive the second indication information carrying an information type of the historical movement information. The first sending module 110 includes a second sending sub-module 112 configured to send the historical movement information corresponding to the information type to the base station in response to receiving the second indication information.

In an embodiment, the second indication information is carried in a UE information request message and/or an RRC reconfiguration message.

In an embodiment, the historical movement information is associated with a cell change within a predetermined time period of the UE, or the historical movement information is associated with a predetermined number of cell changes of the UE.

Figure 6:
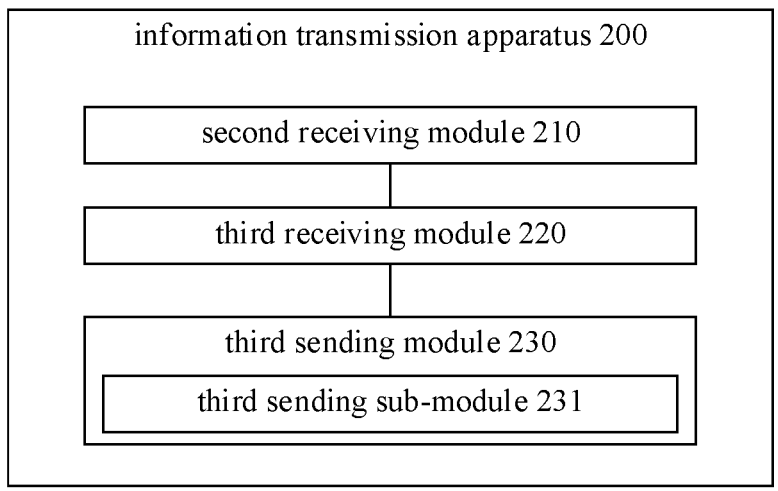
FIG. 6 is a block diagram showing another information transmission apparatus shown according to an embodiment.

Embodiments of the present disclosure further provide an information transmission apparatus, which is applied to a base station of wireless communication. As shown in FIG. 6, the information transmission apparatus 200 includes a second receiving module 210.

The second receiving module 210 is configured to receive historical movement information reported by a UE, the historical movement information includes first movement information, the first movement information is recorded by the UE in response to a cell change of the UE, and the first movement information is associated with the cell change of the UE.

In an embodiment, the first movement information includes at least one of: cell state information associated with the cell change of the UE; or cell change information associated with the cell change of the UE.

In an embodiment, the cell change information includes at least one of: time information of the cell change of the UE; or trigger event information that triggers the cell change of the UE.

In an embodiment, the state information includes at least one of following information of a cell associated with the cell change of the UE: geographic location information, cell frequency information, cell identification information, public land mobile network (PLMN) identification information, or wireless signal measurement result information.

In an embodiment, the cell change of the UE includes one of: cell selection of the UE; cell reselection of the UE; or cell handover of the UE.

In an embodiment, the cell change of the UE includes change of a serving cell of the UE in a connected state, or change of a resident cell of the UE in a non-connected state.

In an embodiment, the historical movement information is carried in a UE information reply message and/or a measurement report message.

In an embodiment, the apparatus 200 further includes a third receiving module 220. The third receiving module 220 is configured to receive first indication information sent by the UE indicating that the UE has the historical movement information.

In an embodiment, the first indication information is carried in a radio resource control (RRC) establishment completion message, and/or an RRC re-establishment completion message, and/or an RRC recovery completion message.

In an embodiment, the apparatus 200 further includes a third sending module 230. The third sending module 230 is configured to send second indication information indicating to report the historical movement information in response to receiving the first indication information.

In an embodiment, the third sending module 230 includes a third sending sub-module 231. The third sending sub-module 231 is configured to send the second indication information carrying an information type of the historical movement information to be reported.

In an embodiment, the second indication information is carried in a UE information request message and/or an RRC reconfiguration message.

In an embodiment, the historical movement information is associated with a cell change within a predetermined time period of the UE, or the historical movement information is associated with a predetermined number of cell changes of the UE.

In an embodiment, the first sending module 110, the second sending module 120, the first receiving module 130, the second receiving module 210, the third receiving module 220, the third sending module 230, etc. can be implemented by one or more central processing units (CPUs), graphics processing units (GPUs), baseband processors (BPs), application specific integrated circuits (ASICs), digital signal processors (DSPs), programmable logic devices (PLDs), complex programmable logic devices (CPLDs), field-programmable gate arrays (FPGAs), general-purpose processors, controllers, micro controller units (MCUs), microprocessors, or other electronic elements, to execute the methods as described above.

Figure 7:
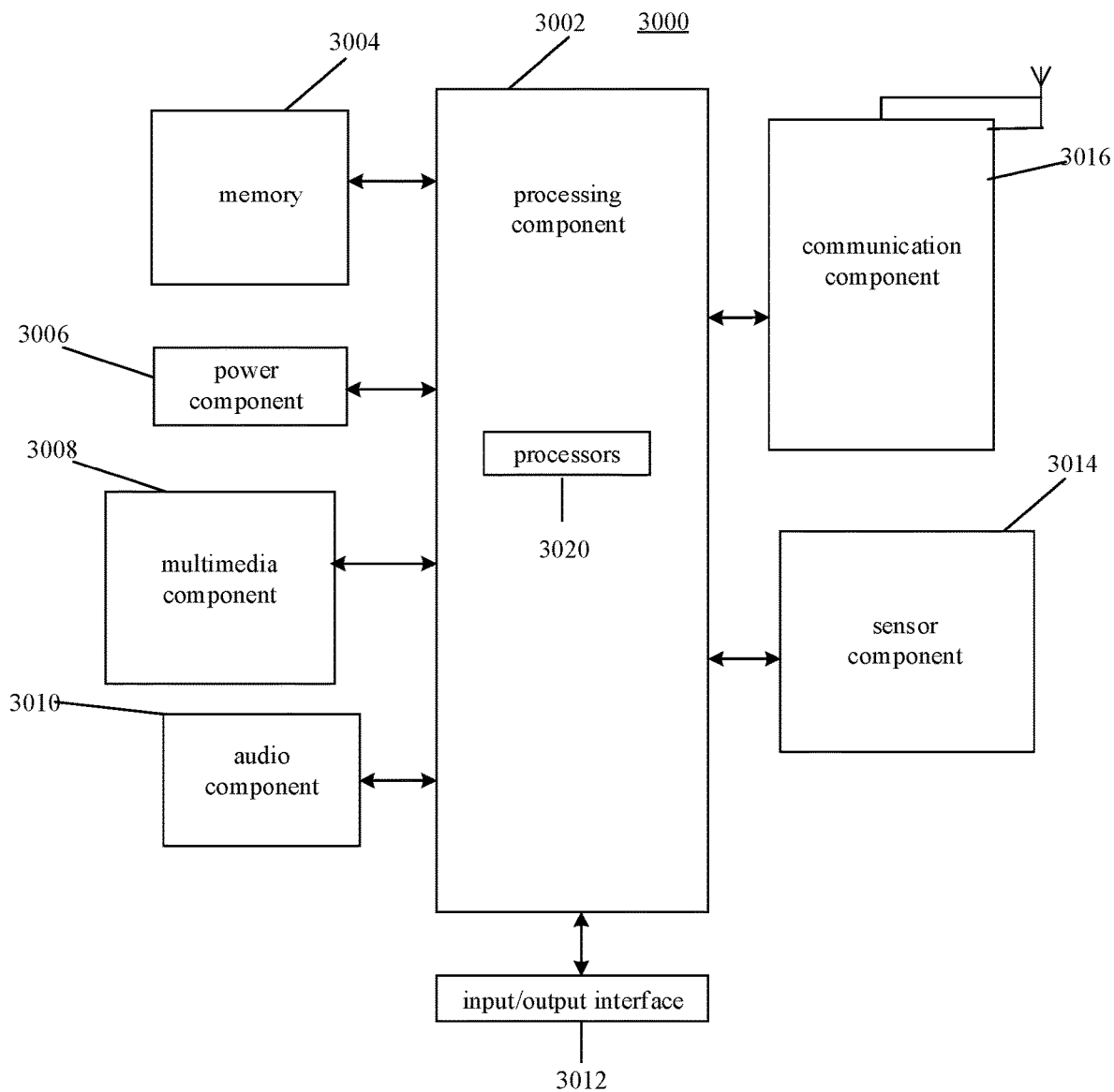
FIG. 7 is a block diagram showing an apparatus for information transmission according to an embodiment.

FIG. 7 is a block diagram showing an apparatus 3000 for information transmission according to an embodiment. For example, the apparatus 3000 may be a mobile phone, a computer, a digital broadcast terminal, a messaging device, a game console, a tablet device, a medical device, a fitness device, a personal digital assistant, or the like.

Referring to FIG. 7, the apparatus 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the apparatus 3000, such as the operations associated with display, phone calls, data communications, camera operations, and recording operations. The processing component 3002 can include one or more processors 3020 to execute instructions to perform all or some of the steps in the above-described methods. Moreover, the processing component 3002 may include one or more modules which facilitate the interaction between the processing component 3002 and other components. For instance, the processing component 3002 may include a multimedia module to facilitate the interaction between the multimedia component 3008 and the processing component 3002.

The memory 3004 is configured to store various types of data to support the operation of the apparatus 3000. Examples of such data include instructions for any applications or methods operated on the apparatus 3000, contact data, phonebook data, messages, pictures, videos, etc. The memory 3004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3006 provides power to various components of the apparatus 3000. The power component 3006 may include a power management system, one or more power sources, and any other components associated with the generation, management, and distribution of power in the apparatus 3000.

The multimedia component 3008 includes a screen providing an output interface between the apparatus 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of time and a pressure associated with the touch or swipe action. In some embodiments, the multimedia component 3008 includes a front camera and/or a rear camera. The front camera and/or the rear camera may receive an external multimedia datum while the apparatus 3000 is in an operation mode, such as a photographing mode or a video mode. Each of the front camera and the rear camera may be a fixed optical lens system or have focus and optical zoom capability.

The audio component 3010 is configured to output and/or input audio signals. For example, the audio component 3010 includes a microphone (MIC) configured to receive an external audio signal when the apparatus 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, such as keyboards, click wheels, buttons, and the like. The buttons may include, but are not limited to, a home button, a volume button, a starting button, and a locking button.

The sensor component 3014 includes one or more sensors to provide state assessments of various aspects of the apparatus 3000. For instance, the sensor component 3014 may detect an open/closed state of the apparatus 3000, relative positioning of components, e.g., the display and the keypad, of the apparatus 3000, change in position of the apparatus 3000 or a component of the apparatus 3000, a presence or absence of user contact with the apparatus 3000, an orientation or an acceleration/deceleration of the apparatus 3000, and change in temperature of the apparatus 3000. The sensor component 3014 may include a proximity sensor configured to detect the presence of nearby objects without any physical contact. The sensor component 3014 may include a light sensor, such as a CMOS or CCD image sensor, for use in imaging applications. In some embodiments, the sensor component 3014 may further include an accelerometer sensor, a gyroscope sensor, a magnetic sensor, a pressure sensor, or a temperature sensor.

The communication component 3016 is configured to facilitate communication, wired or wireless, between the apparatus 3000 and other devices. The apparatus 3000 can access a wireless network based on a communication standard, such as Wi-Fi, 2G, or 3G, or a combination thereof. In an embodiment, the communication component 3016 receives a broadcast signal or broadcast associated information from an external broadcast management system via a broadcast channel. In an embodiment, the communication component 3016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an embodiment, the apparatus 3000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the above-mentioned method.

In an embodiment, there is also provided a non-transitory computer readable storage medium including instructions, such as the memory 3004 including instructions, and the instructions are executable by the processor 3020 in the apparatus 3000, for completing the above-mentioned method. For example, the non-transitory computer-readable storage medium may be a ROM, a random access memory (RAM), a CD-ROM, a magnetic tape, a floppy disc, an optical data storage device, and the like.

Other embodiments of the present disclosure will be apparent to those skilled in the art from consideration of the specification and practice of the present disclosure described here. The present disclosure is intended to cover any variations, uses, or adaptations of the embodiments of the present disclosure following the general principles thereof and including such departures from the embodiments of the present disclosure as come within known or customary practice in the art. It is intended that the specification and examples are considered as illustrative only, with a true scope and spirit of the embodiments of the present disclosure being indicated by the following claims.

It will be appreciated that the embodiments of the present disclosure are not limited to the exact construction that has been described above and illustrated in the accompanying drawings, and that various modifications and changes can be made without departing from the scope thereof. It is intended that the scope of the embodiments of the present disclosure is only limited by the appended claims.

What is claimed is:

1. An information transmission method, comprising:
  receiving, by a user equipment (UE), second indication information carrying an information type of historical movement information sent by a base station, wherein the information type of historical movement information comprises at least one of: a state of the UE, a time period, or a type of cell change; and
  reporting, by the UE, historical movement information corresponding to the information type to the base station in response to receiving the second indication information, wherein the historical movement information comprises first movement information, wherein the first movement information is recorded by the UE in response to a cell change of the UE, and the first movement information is associated with the cell change of the UE.

2. The method of claim 1, wherein the first movement information comprises at least one of following information:
  cell state information associated with the cell change of the UE; or
  cell change information associated with the cell change of the UE,
  wherein the cell change information comprises at least one of following information:
  time information of the cell change of the UE; or
  trigger event information that triggers the cell change of the UE,
  wherein the state information comprises at least one of following information of a cell associated with the cell change of the UE:
  geographic location information, cell frequency information, cell identification information, public land mobile network (PLMN) identification information, or wireless signal measurement information.

3. The method of claim 1, wherein the cell change of the UE comprises one of following information:
  cell selection of the UE;
  cell reselection of the UE; or
  cell handover of the UE.

4. The method of claim 1, wherein the cell change of the UE comprises:
  change of a serving cell of the UE in a connected state; or
  change of a resident cell of the UE in a non-connected state.

5. The method of claim 1, wherein the historical movement information is carried in at least one of following messages:
  a UE information reply message; or
  a measurement report message,
  wherein the historical movement information is associated with a cell change within a predetermined time period of the UE, or the historical movement information is associated with a predetermined number of cell changes of the UE.

6. The method of claim 1, further comprising:
  sending, by the UE, first indication information indicating that the UE has the historical movement information to the base station in response to the UE recorded with the historical movement information,
  wherein the first indication information is carried in at least one of following messages:
  a radio resource control (RRC) establishment completion message;
  an RRC re-establishment completion message; or
  an RRC recovery completion message.

7. The method of claim 1,
  wherein the second indication information is carried in at least one of following messages:
  a UE information request message; or
  a radio resource control (RRC) reconfiguration message.

8. A non-transitory storage medium having stored therein executable programs that, when executed by a processor, cause steps of the information transmission method according to claim 1 to be implemented.

9. An information transmission method, comprising:
  receiving, by a base station, first indication information sent by a user equipment (UE) indicating that the UE has historical movement information;
  sending, by the base station, second indication information carrying an information type of the historical movement information to be reported, wherein the information type of historical movement information comprises: a state of the UE, a time period, or a type of cell change; and
  receiving, by the base station, historical movement information corresponding to the information type reported by the UE, wherein the historical movement information comprises first movement information, wherein the first movement information is recorded by the UE in response to a cell change of the UE, and the first movement information is associated with the cell change of the UE.

10. The method of claim 9, wherein the first movement information comprises at least one of following information:
  cell state information associated with the cell change of the UE; or
  cell change information associated with the cell change of the UE, wherein the cell change information comprises at least one of following information:
  time information of the cell change of the UE; or
  trigger event information that triggers the cell change of the UE,
  wherein the state information comprises at least one of following information of a cell associated with the cell change of the UE:
  geographic location information, cell frequency information, cell identification information, public land mobile network (PLMN) identification information, or wireless signal measurement result information.

11. The method of claim 9, wherein the cell change of the UE comprises one of following information:
  cell selection of the UE;
  cell reselection of the UE; or
  cell handover of the UE.

12. The method of claim 9, wherein the cell change of the UE comprises:
  change of a serving cell of the UE in a connected state; or
  change of a resident cell of the UE in a non-connected state.

13. The method of claim 9, wherein the historical movement information is carried in at least one of following messages:
  a UE information reply message; or
  a measurement report message,
  wherein the historical movement information is associated with a cell change within a predetermined time period of the UE, or the historical movement information is associated with a predetermined number of cell changes of the UE.

14. The method of claim 9,
  wherein the first indication information is carried in at least one of following messages:
  a radio resource control (RRC) establishment completion message;
  an RRC re-establishment completion message; or
  an RRC recovery completion message.

15. The method of claim 9,
  wherein the second indication information is carried in at least one of following messages:
  a UE information request message; or
  an RRC reconfiguration message.

16. A communication device, comprising:
  a processor;
  a memory; and
  an executable program stored in the memory and capable of being run by the processor,
  wherein the processor is configured to execute steps of the information transmission method according to claim 9 when running the executable program.

17. A non-transitory storage medium having stored therein executable programs that, when executed by a processor, cause steps of the information transmission method according to claim 9 to be implemented.

18. A communication device, comprising:
  a processor;
  a memory; and
  an executable program stored in the memory and capable of being run by the processor,
  wherein the processor, when running the executable program, is configured to implement acts comprising:
  receiving second indication information carrying an information type of historical movement information sent by a base station, wherein the information type of historical movement information comprises at least one of: a state of a user equipment (UE), a time period, or a type of cell change; and
  reporting historical movement information corresponding to the information type to the base station in response to receiving the second indication information,
  wherein the historical movement information comprises first movement information, wherein the first movement information is recorded by the UE in response to a cell change of the UE, and the first movement information is associated with the cell change of the UE.

* * * * *